US 9,897,311 B2

(12) United States Patent
Collmer et al.

(10) Patent No.: US 9,897,311 B2
(45) Date of Patent: Feb. 20, 2018

(54) COMBUSTION CHAMBER ASSEMBLY UNIT FOR A VAPORIZING BURNER

(71) Applicant: Eberspächer Climate Control Systems GmbH & Co. KG, Esslingen (DE)

(72) Inventors: Andreas Collmer, Aichwald (DE); Axel Kouril, Salach (DE); Uwe Grotstollen, Esslingen (DE); Lars Bendix, Schorndorf-Weiler (DE); Marcus Heim, Kornwestheim (DE); Oliver Roppelt, Deizisau (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 601 days.

(21) Appl. No.: 14/511,574

(22) Filed: Oct. 10, 2014

(65) Prior Publication Data

US 2015/0102117 A1  Apr. 16, 2015

(30) Foreign Application Priority Data

Oct. 14, 2013 (DE) .................. 10 2013 220 653

(51) Int. Cl.
*F23D 5/10* (2006.01)
*F23D 11/44* (2006.01)
(Continued)

(52) U.S. Cl.
CPC ......... *F23D 11/443* (2013.01); *B60H 1/2203* (2013.01); *F23D 3/40* (2013.01);
(Continued)

(58) Field of Classification Search
CPC . F24C 5/02; B60H 1/2212; F23D 3/40; F23D 11/443; F23D 11/406;
(Continued)

(56) References Cited

U.S. PATENT DOCUMENTS 5,056,501 A * 10/1991 Ida ..................... B60H 1/2212
126/110 B
5,496,171 A 3/1996 Ozawa et al.
(Continued)

FOREIGN PATENT DOCUMENTS

CN 88102194 A 12/1988
CN 2035040 U 3/1989
(Continued)

OTHER PUBLICATIONS

"CN_102200279_B—Machine Translation.pdf", Machine translation, EPO.org, Mar. 6, 2017.*
(Continued)

*Primary Examiner* — Gregory Huson
*Assistant Examiner* — Daniel E Namay
(74) *Attorney, Agent, or Firm* — McGlew and Tuttle, P.C.

(57) ABSTRACT

A combustion chamber assembly unit, especially for a vaporizing burner and particularly especially for a vehicle heater, includes at least two combustion chamber elements (12, 20, 26, 32, 50, 52, 64, 102, 126) with wall areas (12, 34, 46, 54, 64, 104, 130, 140, 142). The at least two combustion chamber elements are arranged in a radially staggered pattern in relation to a longitudinal axis (L) of the combustion chamber and are fixed to one another by laser welding.

13 Claims, 6 Drawing Sheets

(51) Int. Cl.
   *F23D 3/40*    (2006.01)
   *B60H 1/22*    (2006.01)
   *F24C 5/02*    (2006.01)
   *F23D 5/12*    (2006.01)
   *F23D 11/46*   (2006.01)
   *F23D 11/40*   (2006.01)

(52) U.S. Cl.
   CPC ............... *F23D 5/10* (2013.01); *F23D 5/123* (2013.01); *F23D 11/406* (2013.01); *F23D 11/448* (2013.01); *F23D 11/46* (2013.01); *F24C 5/02* (2013.01); *F23D 2213/00* (2013.01); *F23D 2900/05002* (2013.01); *F23D 2900/21002* (2013.01)

(58) Field of Classification Search
   CPC .... F23D 11/448; F23D 11/46; F23D 2213/00; F23D 2900/05002; F23D 2900/21002; F23D 5/10; F23D 5/123
   USPC .................................. 431/7, 170; 237/12.3 C
   See application file for complete search history.

(56) References Cited

U.S. PATENT DOCUMENTS

| | | | |
|---|---|---|---|
| 6,726,114 B2 | 4/2004 | Blaschke et al. | |
| 7,157,066 B2* | 1/2007 | Diener | B82Y 30/00 423/445 B |
| 7,578,669 B2* | 8/2009 | Liu | F23C 13/06 122/367.1 |
| 2003/0022118 A1* | 1/2003 | Suzuki | F23C 13/02 431/243 |
| 2003/0027090 A1* | 2/2003 | Blaschke | B01B 1/005 431/243 |
| 2004/0173692 A1* | 9/2004 | Blaschke | B01B 1/005 237/12.3 C |
| 2005/0136305 A1* | 6/2005 | Eberspach | F23D 3/40 429/435 |
| 2007/0048685 A1* | 3/2007 | Kuenzler | F23D 14/78 431/328 |
| 2008/0124666 A1* | 5/2008 | Stocker | F23C 99/006 431/7 |
| 2008/0134580 A1* | 6/2008 | Kah | B01B 1/005 48/197 FM |
| 2013/0344447 A1* | 12/2013 | Medeiros | F23D 11/107 431/182 |
| 2014/0193759 A1* | 7/2014 | Weber | F23C 7/06 431/314 |

FOREIGN PATENT DOCUMENTS

| | | | |
|---|---|---|---|
| CN | 102200279 B * | 5/2014 | ............... F23D 3/40 |
| DE | 39 14 611 A1 | 12/1989 | |
| DE | 10 019 890 A1 | 10/2001 | |
| DE | 102004005267 A1 | 8/2005 | |
| DE | 102005003653 A1 * | 8/2006 | ............... F23D 3/40 |
| DE | 102005020147 A1 * | 11/2006 | ............... F23D 3/40 |
| DE | 102005032980 B4 * | 4/2008 | ............... F23D 3/40 |
| DE | 10 2009 025 593 A1 | 12/2010 | |
| DE | 10 2009 044 883 A1 | 6/2011 | |
| EP | 1484552 A1 | 12/2004 | |
| EP | 1696174 A1 * | 8/2006 | ............... F23D 3/40 |
| EP | 1970624 A2 * | 9/2008 | ............... F23D 3/40 |
| EP | 2009352 A2 | 12/2008 | |
| EP | 1744100 B1 * | 3/2014 | ............... F23D 3/40 |
| EP | 1970624 B1 * | 12/2016 | ............... F23D 3/40 |
| EP | 1662199 B1 * | 3/2017 | ............... F23D 3/40 |
| JP | 58040413 A * | 3/1983 | ............ F23D 11/443 |
| JP | H 0233522 A | 2/1990 | |
| RU | 2309330 C2 | 10/2007 | |
| RU | 2310128 C1 | 11/2007 | |
| RU | 2426032 C2 | 8/2011 | |

OTHER PUBLICATIONS

"DE_102005032980—Machine Translation.pdf", Machine translation, EPO.org, Mar. 7, 2017.*

"Сущность и основные преимущества сварки лазерным лучом", Aug. 28, 2007, http://www.svarkainfo.ru/rus/lib/blog/?docId=209&year=2007-06.

* cited by examiner

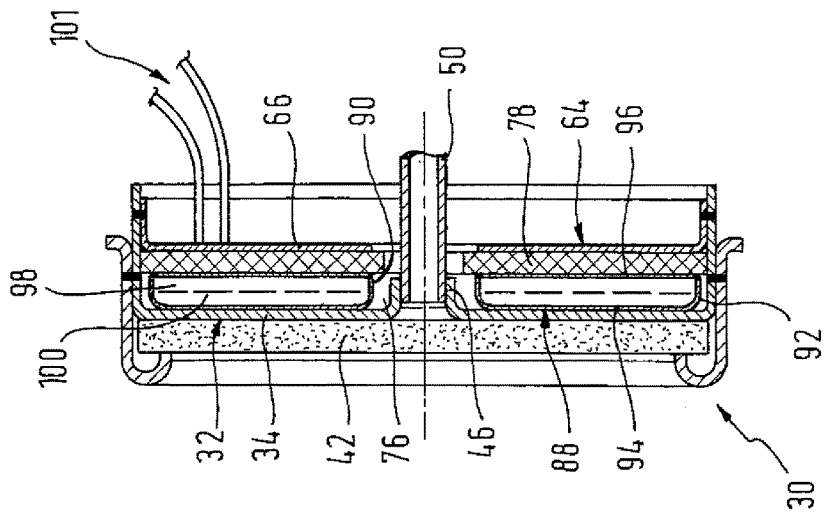
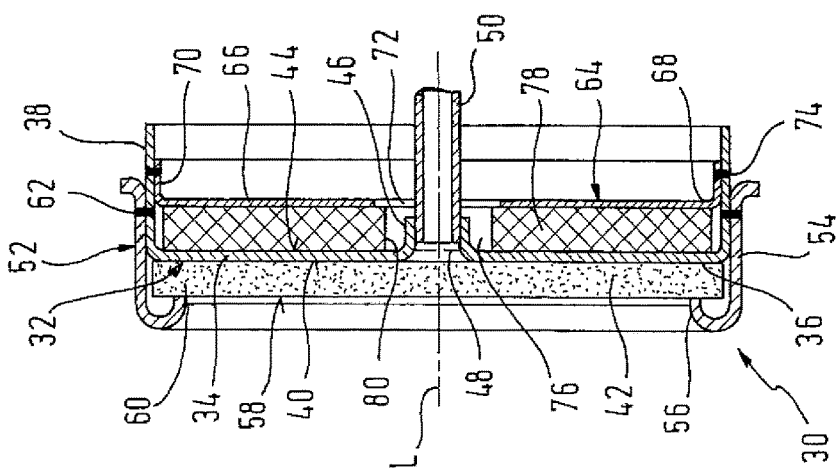

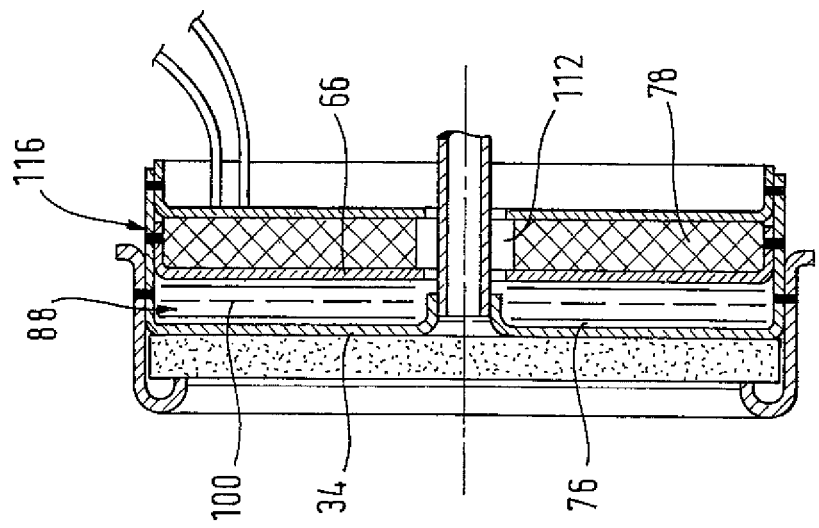
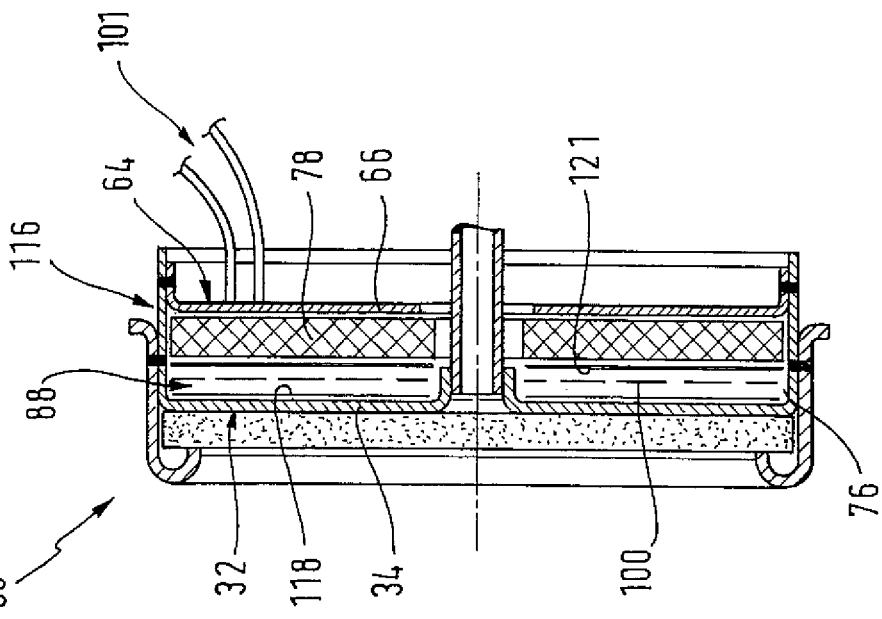

COMBUSTION CHAMBER ASSEMBLY UNIT FOR A VAPORIZING BURNER

CROSS REFERENCE TO RELATED APPLICATIONS

This application claims the benefit of priority under 35 U.S.C. §119 of German Patent Application DE 10 2013 220 653.4 filed Oct. 14, 2013, the entire contents of which are incorporated herein by reference.

FIELD OF THE INVENTION

The present invention pertains to a combustion chamber assembly unit, especially for a vaporizing burner. Such a vaporizing burner may be used, for example, in a vehicle heater to generate heat by the combustion of a fuel/air mixture.

BACKGROUND OF THE INVENTION

DE 10 2009 044 883 A1 discloses a combustion chamber assembly unit for a vaporizing burner, in which a bottom assembly unit for a vaporizing burner, in which assembly unit a bottom assembly unit is designed with a bottom wall and with a circumferential wall, which adjoins same and extends in the direction of a combustion chamber or also partially surrounds same. Porous evaporator medium, into which liquid fuel is fed via a fuel feed line, is provided at the bottom wall. A combustion chamber circumferential wall, which axially adjoins the circumferential wall of the bottom assembly unit and is bent over radially inwardly in its axial end area located at a distance from the bottom assembly unit in order to form a flame diaphragm in this manner. In their areas adjoining each other, the circumferential wall of the bottom assembly unit and the combustion chamber circumferential wall have radially outwardly bent flange areas, which are axially in contact with one another. The bottom assembly unit and the combustion chamber circumferential wall are connected with one another by welding in the area of these flange areas, which are located axially mutually opposite each other and are also in contact with one another.

A combustion chamber fastening element is axially in contact with a radially inwardly bent flange area at the end area of the combustion chamber circumferential wall, which end area forms the flame diaphragm and is likewise bent radially inwardly. These two components are also connected with one another by welding in the radially inwardly bent areas, which are axially in contact with one another.

In its end area positioned adjoining the combustion chamber circumferential wall or the combustion chamber fastening element, a component forming the flame tube has a radially outwardly bent flange area, which is in contact axially with the radially inwardly bent flange area of the combustion chamber fastening element and fixed thereto by welding.

SUMMARY OF THE INVENTION

An object of the present invention is to provide a combustion chamber assembly unit, especially for a vaporizing burner, especially for a vehicle heater, which vehicle heater has a simple and compact design and makes it possible to connect individual combustion chamber elements according to a simple method and in a stable manner.

This object is accomplished according to the present invention by a combustion chamber assembly unit, especially for a vaporizing burner for a vehicle heater, comprising at least two combustion chamber elements with two wall areas, which are arranged radially staggered in relation to one another in relation to a longitudinal axis of the combustion chamber and are connected with one another by laser welding.

On the one hand, a compact design is obtained, in which it is not necessary to deform any sections of the combustion chamber elements intended for the connection radially outwardly or inwardly in case of the design of a combustion chamber assembly unit according to the present invention due to radially staggered positioning and axial overlap in relation to a longitudinal axis of the combustion chamber. Further, it is possible to generate a connection in the radially staggered and axially overlapping wall areas by laser welding in a simple manner.

It is proposed in an especially advantageous embodiment that one of the combustion chamber elements comprise a circumferential wall, which surrounds the longitudinal axis of the combustion chamber preferably without interruptions and extends essentially in the direction of the longitudinal axis of the combustion chamber, that a further combustion chamber element comprise a circumferential wall, which surrounds the combustion chamber longitudinal axis preferably without interruptions and extends in the direction of the longitudinal axis of the combustion chamber, and that the circumferential wall of one combustion chamber element extend over the circumferential wall of the further combustion chamber element on its outer side axially at least partially and be fixed to same by laser welding.

To connect with circumferential walls, which surround one another, already during a preassembly phase and in a basically more stable manner, it is proposed that the circumferential wall of one combustion chamber element and the circumferential wall of the other combustion chamber element be in contact with one another or/and be fitted one into the other by press fit or/and be fitted in one another by press fit. This also facilitates, in particular, the performance of a laser welding operation on elements that are directly in contact with one another.

A connection of two combustion chamber elements, which is also secured especially against the discharge of combustion waste gases and fuel, can be achieved by the circumferential wall of one combustion chamber element and of the circumferential wall of the further combustion chamber element being fixed to one another by a continuous laser weld seam extending in the circumferential direction about the longitudinal axis of the combustion chamber preferably without interruptions.

In an especially advantageous combustion chamber assembly unit, which can also have a modular design, a bottom wall may be provided, which comprises a bottom part forming a combustion chamber element with a first bottom wall and with a first circumferential wall, which extends from an outer edge area of the first bottom wall essentially in the direction of the longitudinal axis of the combustion chamber preferably in the direction away from a combustion chamber and a ring-shaped holding part forming a combustion chamber element with a second circumferential wall and with a contact area that is in contact with a porous evaporator medium provided at the first bottom wall, wherein the second circumferential wall extends axially at least partially over the first circumferential wall on its outer side and is fixed to same by laser welding.

To make it possible to arrange at this bottom wall additional elements, e.g., an electrically energizable heating arrangement supporting the evaporation of fuel, it is further proposed that the bottom assembly unit comprise a second holding part forming a combustion chamber element with a second bottom wall and with a third circumferential wall, which extends from a radially outer edge area of the second bottom wall essentially in the direction of the longitudinal axis of the combustion chamber, preferably in the direction away from the combustion chamber, wherein the first circumferential wall or/and the second circumferential wall extends axially at least partially over the third circumferential wall on its outer side and is fixed to same by laser welding, and wherein a first mounting space is formed between the first bottom wall and the second bottom wall.

Mutual interference of different laser welded connection areas can be avoided by the second circumferential wall being fixed in a first axial area by laser welding, by the first circumferential wall or/and the second circumferential wall being fixed at the third circumferential wall in a second axial area by laser welding, and by the first axial area being located axially offset in relation to the second axial area.

It is proposed in an embodiment that makes it possible to accommodate additional components, e.g., heat-insulating material, that the bottom assembly unit comprise a third holding part forming a combustion chamber element with a third bottom wall and with a fourth circumferential wall extending from a radially outer edge area of the third bottom wall essentially in the direction of the longitudinal axis of the combustion chamber, preferably in the direction away from a combustion chamber, wherein the first circumferential wall or/and the second circumferential wall or/and the third circumferential wall extends axially at least partially axially over the fourth circumferential wall on its outer side and is fixed to same by laser welding, and wherein a second mounting space is formed between the second bottom wall and the third bottom wall.

Mutual interference of laser welded areas can also be avoided here by the first circumferential wall or/and the second circumferential wall or/and the third circumferential wall being fixed at the fourth circumferential wall in a third axial area by laser welding and by the third axial area being axially offset in relation to the first axial area or/and the second axial area.

The principles of the present invention can be used to achieve a stable connection of a fuel feed line by a bend extending axially over a fuel feed line on its outer side being provided at the first bottom wall, wherein the fuel feed line forms a combustion chamber element and being fixed at the bend of the first bottom wall by laser welding.

A vaporizing burner circumferential wall forming a combustion chamber element may be provided in the above-mentioned modular design of a combustion chamber assembly unit, wherein the combustion chamber circumferential wall extends axially at least partially over a circumferential wall of a bottom assembly unit forming a combustion chamber element on its outer side and is fixed to same by laser welding. Provisions may be made here, in particular, for the combustion chamber circumferential wall to extend axially at least partially over the second circumferential wall of the first holding part radially on the outside and to be fixed to same by laser welding.

The principles of the present invention, i.e., the preparation of a laser welded connection in wall areas located in a radially staggered pattern in relation to one another, may be used, furthermore, to fix the following combustion chamber elements to a combustion chamber circumferential wall forming a combustion chamber element by laser welding:

an ignition element holder forming a combustion chamber element, wherein the ignition element holder is in contact by a support edge area forming a wall area with an outer side of the combustion chamber circumferential wall and is fixed to same by laser welding, or/and a combustion chamber fastening element forming a combustion chamber element, wherein the combustion chamber fastening element extends with a circumferential wall axially over the combustion chamber circumferential wall on its outer side and is fixed to same by laser welding, or/and a flame diaphragm forming a combustion chamber element, wherein the flame diaphragm comprises a circumferential wall, over which the combustion chamber circumferential wall extends axially on its outer side and to which it is fixed by laser welding.

To make it possible to provide a combustion chamber assembly unit having the design according to the present invention in a cost-effective manner and also with high manufacturing precision, it is proposed that at least two combustion chamber elements fixed to one another by laser welding be formed as deep-drawn parts preferably from or made of steel plate.

The present invention will be described in detail below with reference to the following figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 2 is a bottom assembly unit of the combustion chamber assembly unit according to FIG. 1 in a longitudinal section;

FIG. 3 is a view of a bottom assembly unit corresponding to FIG. 2 with an alternative design;

FIG. 4 is a view of a bottom assembly unit corresponding to FIG. 2 with an alternative design;

FIG. 5 is a view of a bottom assembly unit corresponding to FIG. 2 with an alternative design;

FIG. 6 is a view of a bottom assembly unit corresponding to FIG. 2 with an alternative design;

DESCRIPTION OF THE PREFERRED EMBODIMENTS

Figure 1:
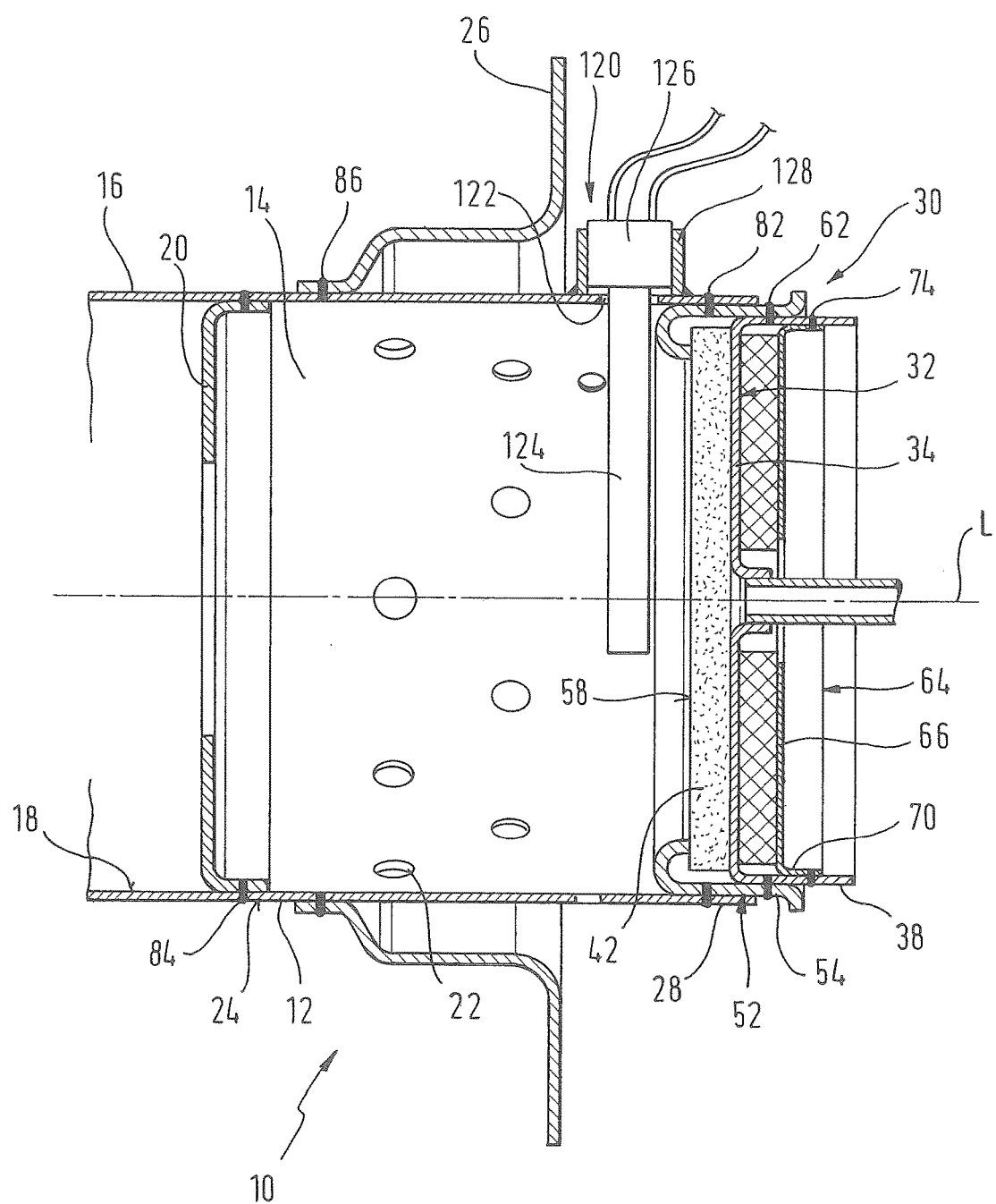
FIG. 1 is a partial longitudinal sectional view of a combustion chamber assembly unit for a vaporizing burner, for example, of a vehicle heater.

Referring to the drawings in particular, a combustion chamber assembly unit is generally designated by 10 in FIG. 1. The combustion chamber assembly unit, which can be used, for example, in a vaporizing burner of a vehicle heater, comprises an essentially cylindrical combustion chamber circumferential wall 12, which is formed, for example, from sheet metal material, e.g., steel plate, and which surrounds a combustion chamber 14 in a longitudinal area. Adjoining the combustion chamber 14, the combustion chamber circumferential wall 12 passes integrally over into a flame tube 16. A flame diaphragm 20 may be fixed in this transition area on an inner side 18 of the combustion chamber circumferential wall 12 of flame tube 16, for example, by welding. To make it possible to introduce combustion air into the combustion chamber 14, a plurality of combustion air inlet openings 22 may be provided on the combustion chamber circumferential wall 12, for example, distributed in the circumferential direction about a longitudinal axis L of the combustion chamber assembly unit 10. Further, a mounting flange 26 rigidly connected with the combustion chamber circumferential wall 12, for example, by welding, may be provided on an outer side 24 of the combustion chamber circumferential wall 12. This flange 26 may preferably likewise be manufactured from sheet metal material, e.g., steel plate, for example, by deep drawing, and used to fix the combustion chamber assembly unit 10 in a heater.

A bottom assembly unit 30 described in more detail in reference to FIG. 2 is provided and fixed at an axial end area 28 of the combustion chamber circumferential wall 12. This bottom assembly unit 30 comprises as a central component a bottom part 32 with a generally pot-like shape, which is, for example, essentially rotationally symmetrical to the longitudinal axis L. The bottom part 32 comprises a first bottom wall 34 and a first circumferential wall 38, which adjoins the first bottom wall 34 in a radially outer edge area 36 of the first bottom wall 34. A porous evaporator medium 42 having, for example, a disk-like design is provided on a front side 40 of the first bottom wall 34, which said front side is positioned or can be positioned such that it faces the combustion chamber 14. This porous evaporator medium may be designed as a knitted fabric, braiding, foamed ceramic, metal foam or the like, i.e., generally as a component or assembly unit with a pore-like structure, which guarantees the transportation of liquid fuel contained therein by capillary delivery action. The first circumferential wall 38 extends starting from the first bottom wall 34, for example, essentially in the direction of the longitudinal axis L on a rear side 44 of the first bottom wall 34, which said rear side is oriented opposite the front side 40, in the direction away from the porous evaporator medium 42 and hence also in the direction away from the combustion chamber 14 of the combustion chamber assembly unit 10.

In a central area of the first bottom wall 34, the latter has an opening 48, which is provided by a bend 46 and into which opens a fuel feed line 50 in order to feed liquid fuel into the porous evaporator medium 42.

In the shape shown, i.e., with the essentially planar first bottom wall 34 designed, e.g., without fuel guide canals, with the essentially cylindrical first circumferential wall extending starting from it and with the bend 46 for forming the opening 48, the bottom part 32 may be manufactured, for example, from steel plate material in a deep-drawing operation in a simple manner and with high manufacturing precision. An essentially disk-shaped or ring disk-like blank can be punched out for this from a metal sheet and then brought to the desired shape in a deep-drawing operation. Further, e.g., machining operations are not necessary.

A first holding part generally designated by 52 has an essentially ring-like shape and comprises a second circumferential wall 54 extending essentially in the direction of the longitudinal axis L. The second circumferential wall 54 passes over into an essentially radially inwardly curved contact area 56 in one of its axial end areas. The first holding part 52 is curved in this contact area 56 in the direction of the side 58 of the porous evaporator medium 42 that is to be oriented such that it will face the combustion chamber 14. In the other axial end area, the first holding part 52 is curved radially outwardly starting from the essentially cylindrically shaped second circumferential wall 54. A lead-in bevel is thus obtained, which can be embodied with a simple design and which makes it possible in a simple manner to push the first holding part 52 with its second circumferential wall 54 and the bottom part or element 32 with its first circumferential wall 38 over each other. The two circumferential walls 54, 38 are positioned during this pushing into one another such that they extend one over the other axially at least partially. The first holding part 52 can now be pushed over the bottom part 32 to the extent that the contact area 56 is pressed directly against the porous evaporator medium 42 in the radially outer edge area i.e., it touches this. An intermediate contact element, for example, a wick ring or the like, via which the contact area 56 would then touch the porous evaporator medium 42 and be pressed against the bottom part 32 or the first bottom wall 34, could be optionally provided here between the contact area 56 and the porous evaporator medium 42. The operation of pushing one over another may be a force-guided operation, i.e., it may last until a correspondingly great resistance to motion develops due to a corresponding contact force of the contact area 56 at the porous evaporator medium 42, or it can be moved away, i.e., continued until a certain, preset relative positioning of the first holding part 52 relative to the bottom part 32 is achieved.

The first holding part 52 may also be manufactured with the shape shown in FIG. 2 in a simple manner by deforming a ring disk-like sheet metal blank, preferably from steel plate. The dimensioning may be such that when the two circumferential walls 54, 38 are pushed one over the other, a press fit, which guarantees stable fixation of the first holding part 52 in relation to the bottom part 32 without additional fastening measures, is generated by press fit. As an alternative or in addition, this rigid connection may be generated by connection in substance, for example, welding. The direct contact of the two circumferential walls 54, 38 with one another may be advantageously used for this to achieve the welding together of the two circumferential walls 54, 38 by means of a welding laser brought up from the radially outward direction. For example, a weld seam 62 extending about the longitudinal axis L in the circumferential direction can thus be generated. A plurality of weld areas or welding spots distributed over the circumference may, of course, also be generated, especially when a stable and liquid-tight connection of the two circumferential walls 54, 38 with one another has already also been generated by press fit.

The porous evaporator medium 42 is also pressed at the same time, especially in its radially outer edge area 60, against the bottom part 32 by the first holding part 52 and the bottom part 32 being pushed one over the other and due to the fact that contact of the contact area 56 with the porous evaporator medium 42 is also generated in the process. This can be used to fix the porous evaporator medium 42 to the bottom part 32 without further fastening measures. At the same time, the contact of the contact area 56 at the radially outer edge area 60 of the evaporator medium 42 may be used to prevent fuel that is discharged especially in the radially outwardly oriented end face area and collects there from flowing into the combustion chamber 14. Discharge of liquid fuel from the porous evaporator medium 42 in the direction of the combustion chamber 14 is thus possible only at the area of the side 58 of the porous evaporator medium 42 that is exposed towards the combustion chamber 14. It should be noted that in addition to the fixing action of the holding area 56, the porous evaporator medium 42 may, of course, also be fixed by additional fastening measures acting directly between this medium 42 and the bottom part 32. For example, the porous evaporator medium 42 could be connected to the bottom part 32 by soldering or by sintering.

A second holding part 64 is arranged opposite the rear side 44 of the first bottom wall 34 at an axially spaced location. This second holding part comprises a second bottom wall 66 positioned at an axially spaced location from the first bottom wall 34 as well as a third circumferential wall 70 extending in a radially outer edge area 68 away from the second bottom wall 66 essentially in the direction of the longitudinal axis L. This circumferential wall 70 is oriented such that it extends away from the first bottom wall 34 and thus also away from the porous evaporator medium 42 and thus in the same direction as the first circumferential wall 38. In a central area, the second holding part 34 has an opening 72, through which the fuel feed line 50 is led in the direction of the first bottom wall 34.

The second holding part 64 is advantageously also manufactured as a shaped sheet metal part, preferably from steel plate, in a deep-drawing operation, and is shaped such that it can be pushed with its third circumferential wall 70 into the bottom part 32, i.e., the first circumferential wall 38 extends axially over the third circumferential wall 70. The dimensioning may likewise be such here that the second holding part 64 is held in the bottom part 32 by press fit alone. As an alternative or in addition, it is possible to generate a weld seam 74 extending, for example, about the longitudinal axis L or a plurality of welded areas or welding spots following each other in the circumferential direction in this case as well, advantageously by laser welding.

The bottom part 32 and the second holding part 64 enclose a first mounting space 76 between them. This is defined in the axial direction essentially by the two bottom walls 34, 66 and is defined radially outwardly essentially by a section of the first circumferential wall 38. A heat-insulating material 78, which is formed, for example, with fiber material, e.g., ceramic nonwoven material or foamed material, and which advantageously fills the volume of the first mounting space 76 essentially completely and has a passage opening 80 for the fuel feed line 50 or the bend 46 of the bottom part 32 in the central area, may be arranged in this first mounting space 76.

The heat-insulating material 78, which may thus have an essentially ring disk-like shape, may be positioned such that it lies on the first bottom wall 34 before the second holding part 64 is pushed into the bottom part 32. The second holding part 64 with its third circumferential wall 70 is then pushed into the first circumferential wall 38 of the bottom part 32, i.e., until a sufficient force of reaction is generated by the heat-insulating material 78, or it is steered away, i.e., until a certain relative positioning of the second holding part 64 in relation to the bottom part 32 is achieved. If necessary, the rigid connection can be generated in this state by connection in substance, i.e., for example, by forming the weld seam 74.

By providing heat-insulating material 78 on the rear side 44 of the bottom wall 34, heat losses occurring in this direction and hence excessive cooling of the porous evaporator medium 42 are prevented from occurring, which increases the efficiency of combustion and reduces the necessary amount of energy introduced especially during the start phase of the combustion.

The bottom assembly unit 30 described in detail above with reference to FIG. 2 may be provided in a modular design in adaptation to different embodiments of a combustion chamber assembly unit 10. For example, the thickness of the porous evaporator medium 42 to be used may be varied in a simple manner, as can the thickness of a heat-insulating material 78 that is possibly to be used. Such variations in thickness affect only the relative positioning of the bottom part 32 in relation to the first holding part 52 and of the second holding part 64 in relation to the bottom part 32. Since, especially if these different parts are also to be connected with one another by substance, for example, by welding, these welded areas, i.e., for example, the weld seams 62, 74, are positioned in different axial areas, the arrangement, for example, of the second holding part 64 is not compromised by the connection of the bottom part 32 with the first holding part 52.

The bottom assembly unit 30 having such a design can be fixed after its assembly on the combustion chamber circumferential wall 12 as a module. The holding part 52 with its second circumferential wall 54 is pushed for this purpose into the axial end area 28 of the combustion chamber circumferential wall 12. It is possible now, for example, to proceed such that, using a reference, for example, an ignition element holder 128, which will be explained below, is pushed into the end area 28 of the combustion chamber circumferential wall 12 to the extent that a defined positioning is reached. The dimensioning may be such for this as well that a press fit, which guarantees stable fixation of the bottom assembly unit 30 at the combustion chamber circumferential wall 12, is already generated during this pushing in.

The second circumferential wall 54 is advantageously connected, especially also to generate a sealed closure against the discharge of combustion waste gases, to the combustion chamber circumferential wall 12 by connection in substance, preferably welding. A weld seam 82, which advantageously extends about the longitudinal axis L without interruptions, may again be generated for this. This may advantageously also be brought about by laser welding because of the radially staggered arrangement of the areas to be welded together. It is recognized in FIG. 1 that the weld seam 82 thus generated is also located offset in relation to the weld seams 62, 74 of the bottom assembly unit 30. It should be noted in this connection that especially also the rigid connection of the combustion chamber circumferential wall 12 and of the flame tube 16 and the connection of the mounting flange 26 to the combustion chamber circumferential wall 12 may also be embodied by welding, for example, laser welding, i.e., the generation of weld seams 84, 86 or of individual welded areas or welding spots following each other in the circumferential direction.

FIGS. 3 through 6 show embodiment variants of bottom assembly units that can be used in the combustion chamber assembly unit 10 according to FIG. 1. Components that correspond to components already described above in terms of design or function are designated by the same reference numbers in these views. The differences existing from the above-described embodiment will be dealt with essentially below with reference to these FIGS. 3 through 6.

FIG. 3 shows a bottom assembly unit 30, in which the above-described heat-insulating material 78, on the one hand, and a heating arrangement generally designated by 88, on the other hand, are arranged in an axially staggered pattern in the first mounting space 76 between the first bottom wall 34 and the second bottom wall 66. The heating arrangement is provided directly adjacent to the first bottom wall 34, while the heat-insulating material 78 is positioned on the side of the heating arrangement 88 facing away from the first bottom wall 34 and thus also adjacent to the second bottom wall 66, and it can thus also guarantee thickness compensation.

Similarly to the heat-insulating material 78, the heating arrangement 88 is basically of a ring disk-shaped design as well and has in its central area an opening 90 for the passage of the fuel feed line 50 or of the bend 46. The heating arrangement 88 comprises a housing 92, which comprises a ring shell-like housing part 94 and a cover-like housing part 96 connected rigidly thereto, e.g., by crimping. These two housing parts 94, 96 enclose in an interior space 98 an electrically energizable heating element 100, which is indicated only generally and which can be electrically energized via supply lines. The electrically energizable heating element may be provided as an elongated heat conductor designed, for example, in a plate-like manner, but it may also comprise a heat conductor extending in a helical, coil-like, meandering or another manner. Especially if the housing parts 94, 96 are formed from metallic material, for example, sheet metal material, it is advantageous or necessary to arrange electrically insulating material, for example, in a plate-like configuration, between the electrically energizable heating element 100 and the two housing parts 94, 96 enclosing this in order to avoid an electric short circuit.

The design shown in FIG. 3 creates the possibility of heating the porous evaporator material 42 and thus to increase the rate of evaporation of fuel contained therein especially during a start phase by energizing the electrically energizable heating element 100 of the heating arrangement 88. Heat losses are reduced because the heat-insulating material 78 is provided in the first mounting space 76 at the same time on the side of the heating arrangement 88 facing away from the porous evaporator medium 42.

The axial extension of the first mounting space 76 for receiving both the heating arrangement 88 and the heat-insulating material 78 can be adapted in a simple manner by the second holding part 64 being inserted into the bottom part 32 only to the extent that the heat-insulating material 78 and the heating arrangement 88 are fixed axially, for example, under a slight axial pressure, and no further measures are thus necessary, either, to fix this heating arrangement 88 in the first mounting space 76. As is shown especially by a comparison of FIG. 2 and FIG. 3, the second holding part 64, which may have a design identical to that of the second holding part 64 used in the embodiment according to FIG. 2, dips less deeply into the bottom part 32, which likewise has an identical design, in the embodiment variant shown in FIG. 3.

FIG. 4 shows an embodiment variant in which a third holding part 102 is inserted into the bottom part 32 on the side of the second holding part 64 facing away from the first bottom wall 34.

The third holding part 102 comprises a third bottom wall 104 and, in a radially outer area thereof adjacent to same, a fourth circumferential wall 108, which extends in the direction away from the bottom part 32. In its central area, the third bottom part 102 has an opening 110 for the passage of the fuel feed line 50. For example, the third holding part 102 may have a design identical to that of the second holding part 64, so that the number of components having different shapes can be kept low.

Together with the second holding part 64, the third holding part 102 defines a second mounting space 112, which follows the first mounting space 76 in the direction away from the first bottom wall 34. The heating arrangement 88 already mentioned above is provided in the first mounting space 76 in this embodiment. This heating arrangement 88 can be energized via the lines 101. Respective passage openings must be provided to this end for these lines 101 in the two holding parts 64, 102. The heat-insulating material 78 is arranged in the second mounting space 112 between the second bottom wall 66 and the third bottom wall 104, so that this material is now positioned such that it is physically separated from the heating arrangement 88.

When assembling the bottom assembly unit 30 shown in FIG. 4, the heating arrangement 88 is positioned first on the rear side 44 of the first bottom wall 30, and the second housing part 64 is then pushed into the first outer circumferential wall 38 until the housing 92 of the heating arrangement 88 is held axially between the two bottom walls 34, 66, for example, with a slight press fit. The second holding part 64 can already be held in this state at the bottom part 32 with a press fit and can be additionally fixed thereto by the weld seam 74. The heat-insulating material 78 is then positioned adjacent to the second bottom wall 66, and the third holding part 102 is inserted thereafter, for example, until it comes into contact with the second holding part 64 or/and the heat-insulating material 78 is compressed to the preset extent and is thus held between the second bottom wall 66 and the third wall 104. The holding part 102 can be held in this state by press fit in the first circumferential wall 38. As an alternative or in addition, fixation may be brought about by connection in substance, i.e., for example, welding. A weld seam 114 or a plurality of welded areas or welding spots following each other in the circumferential direction can be generated here as well, for example, by a laser welding operation. The welding together of the two holding parts 64, 102 may also be carried out in a common welding operation, i.e., after positioning both holding parts 64, 102 in the bottom part 32, especially if the two holding parts 64, 102 are also held by press fit in the first circumferential wall 38. Further, the first holding part 52 and with this also the porous evaporator medium 42 can be fixed only after insertion of the second holding part 64 or of the third holding part 102 at the bottom part in this and all other embodiments of the bottom assembly unit 30.

FIG. 5 shows an embodiment of a bottom assembly unit 30, in which the heating arrangement 88 is inserted into the first mounting space without the provision of an additional housing, as it can be recognized in FIGS. 3 and 4, together with the heat-insulating material 78. This means that the bottom part 32 and the second holding part 64 essentially also provide a heating arrangement housing 116. The electrically energizable heating element 100 is thus located freely between the two bottom walls 34, 66. To prevent an electric short circuit, a single-layer or multilayer electrically insulating material 118 of, for example, a plate-like or sheet-like design is located between the electrically energizable heating element 100 and the first bottom wall 34. At least one or more layers of an insulating material 121 having, for example, a plate-like or sheet-like design may likewise be provided on the side of the electrically energizable heating element 100 facing away from the first bottom wall 34, and this material 121 may be followed by the heat-insulating material 78. If this heat-insulating material 78 is also an electrically insulating material and has a sufficient thermal loadability, this may also be positioned directly adjacent to the electrically energizable heating element 100, omitting the electrically insulating material 121.

To achieve stable positioning of the heating arrangement 88 in the heating arrangement housing 116 provided by the housing part 32 and the second holding part 64, the second holding part 64 may be inserted into the bottom part 32 so deeply that the individual components of the heating arrangement 38 arranged in a layer-like manner as well as the heat-insulating material 78 are held axially between the bottom walls 34, 66.

For example, artificial mica material, e.g., Micanite, may be used as the electrically insulating material 118, 121. The electrically insulating material 118 between the electrically energizable heating element 100 and the first bottom wall 34 may have a thickness of, for example, up to about 0.5 mm. The electrically insulating material 121 on the side of the electrically energizable heating element 100 facing away from the first bottom wall 34 may likewise be formed from artificial mica material, e.g., Micanite, and have a thickness of up to 1 mm. As a result, this electrically insulating material 121 may also provide at the same time the functionality for heat insulation and be provided instead of the heat-insulating material 78 and may be positioned in this case directly adjacent to the second bottom wall 66 of the second holding part 64.

The embodiment shown in FIG. 6 uses again two mounting spaces 76, 112 following each other axially. The heating arrangement 88 having the design described above with reference to FIG. 5 is positioned in the first mounting space 76 located directly adjacent to the first bottom wall 34 and is held between the first bottom wall 34 and the second bottom wall 66. The heat-insulating material 78 is arranged in the second mounting space 112 then following, so that this is now separated physically from the heating arrangement 88 by the second bottom wall 66.

The above-described design of a combustion chamber assembly unit 10 and of the bottom assembly unit 30 that can be used therefor creates the possibility of using, adapted to different requirements, for example, porous evaporator media having different thicknesses in a simple manner and utilizing the modular character, of adapting the axial positioning of the bottom assembly unit 30 in the combustion chamber circumferential wall 12 as well as of providing a heating arrangement and of arranging same in a defined positioning in a mounting space provided therefor, which applies equally to the heat-insulating material to be provided as well. It is thus also possible, in particular, to design the evaporator assembly unit 10 adapted to use with different types of fuel, i.e., for example, gasoline or diesel fuel. This is carried out with the use of system components that can be manufactured with a simple construction, because all carrying components, i.e., the bottom part 32 as well as the holding parts 52, 64 and 102 can be manufactured essentially as shaped sheet metal parts preferably in a deep-drawing operation and can likewise be connected with one another and also with the combustion chamber circumferential wall in a simple and stable manner.

Improved heat coupling into the porous evaporator medium is guaranteed during energization of the electrically energizable heating element 100 due to the possibility of omitting a separate housing of the heating arrangement and of using, instead, the bottom part 32 and the second holding part 64 that follows same or is inserted into this as a heating arrangement housing 116. Further, the necessary installation space and weight can be reduced and also costs can be saved due to the possibility of omitting a separate housing of the heating arrangement. At the same time the heating surface that can be used for the electrically energizable heating element 100 can be enlarged, because this heating element 100 can extend radially on the outside nearly up to the first circumferential wall 38, so that the heat output can also be increased, in principle. The individual components of the heating arrangement are advantageously designed as independent components, i.e., not as printed or printable elements.

An ignition element generally designated by 120 is provided associated with the combustion chamber assembly unit 10 in FIG. 1. This ignition element 120, designed, for example, as a glow plug, passes through an ignition element passage opening 122 provided in the combustion chamber circumferential wall 12 and protrudes into the combustion chamber 14 with an igniting area 124, which can be heated when it is electrically energized. A head area 126 of the ignition element 120, positioned outside the combustion chamber 14, i.e., on the outer side 24 of the combustion chamber circumferential wall 12, is fixed in an ignition element holder 128, which will be explained in detail below. The igniting area 124 of the ignition element 120 extends into the combustion chamber 14 preferably essentially at right angles to the longitudinal axis L, so that this area 124 is positioned essentially in parallel to and at a defined spaced location from the side 58 of the porous evaporator medium 42 located facing the combustion chamber 14. Due to the above-described variability of the depth of fitting of the first holding part 52 into the circumferential wall 12, the axial distance of the ignition element 120 or of the igniting area from the porous evaporator medium 42 can be, for example, adapted to different types of fuels to be used.

The ignition element holder 128 is advantageously designed as a component separate from the combustion chamber circumferential wall 12 and is fixed on the outer side 24 of the combustion chamber circumferential wall 12 by connection in substance, for example, by welding, soldering or bonding. This also guarantees great accuracy in positioning the ignition element 120.

Figure 7:
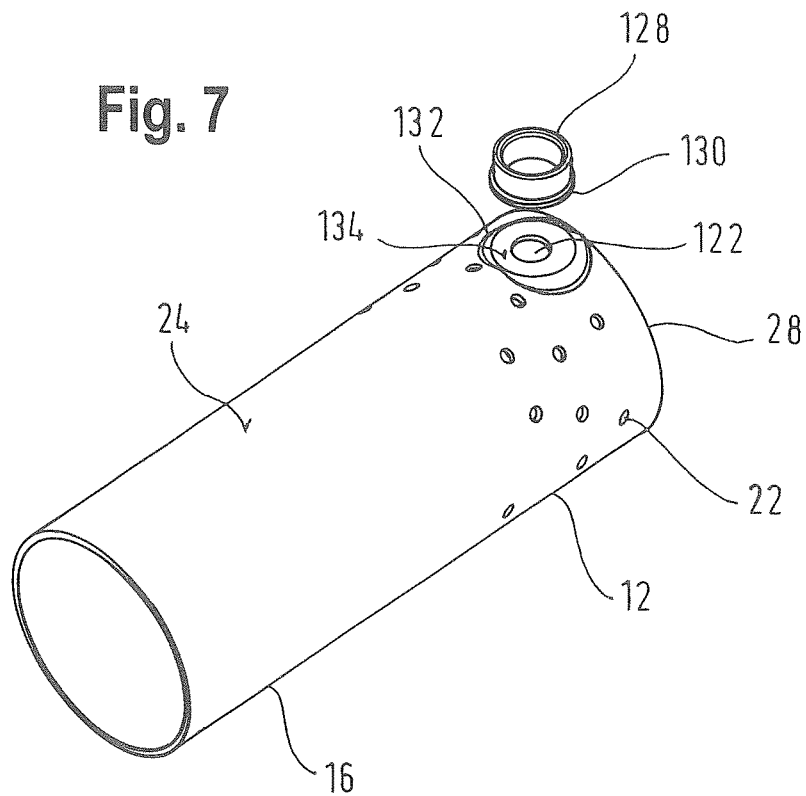
FIG. 7 is an essentially cylindrical combustion chamber circumferential wall with a flame tube formed integrally with it and with an ignition element holder to be fixed on the outer side of the combustion chamber circumferential wall.

In the exemplary embodiment shown in FIG. 7, the ignition element holder 128 is designed with an essentially ring-like shape as a milled part, turned and milled part, turned part or metal injection molding or precision casting. A support edge area 130 thereof may be fixed on the outer side 24 of the combustion chamber circumferential wall 12. For example, an embossing 132 may be generated for this to generate an essentially planar, non-curved contact surface 134 on the combustion chamber circumferential wall 12, with which the support edge area 130 can be correspondingly in contact planarly and fixed in a stable manner. The ignition element 120 can then be inserted with its head area 126 into the correspondingly shaped contour of the ignition element holder 128 and locked therein, for example, by press fit, optionally additionally by bonding or the like. If the head area 126 is designed to fix the ignition element 120 with an external thread, an internal thread may be correspondingly provided on the inner side of the ignition element holder 128 having a ring-like design. The axial positioning of the ignition element 120 in relation to the combustion chamber circumferential wall 12 can be defined by the contact of the head area 126 on the outer side 24 of the combustion chamber circumferential wall 12.

Figure 8:
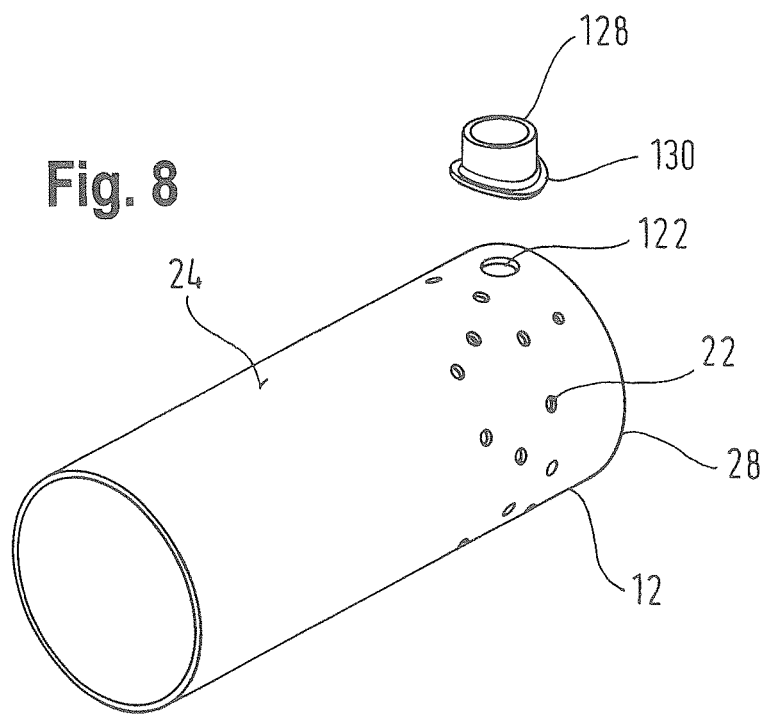
FIG. 8 is a view corresponding to FIG. 7 with an alternative embodiment.

FIG. 8 shows an embodiment in which the ignition element holder 128 is also formed, for example, with the edge area 130 as a shaped sheet metal part. The edge area 130 is curved here adapted to the curved contour of the outer side 24 of the combustion chamber circumferential wall 12 and is located, surrounding the ignition element passage opening 122, on the outer side 24 or is rigidly connected therewith by welding or soldering or bonding.

Since the ignition element holder 128 is designed as a separate component that can be manufactured in a simple and cost-effective manner in the case of the combustion chamber assembly unit 10 shown especially also in reference to FIGS. 7 and 8, it is also possible to provide ignition element holders 128 having different shapes adapted to different ignition elements that are to be used. If, for example, an ignition element with a non-rotationally symmetrical contour of the head area 12 shall be used, a correspondingly shaped ignition element holder 128 can be used and fixed on the outer side 24 of the combustion chamber circumferential wall 12.

Figure 9:
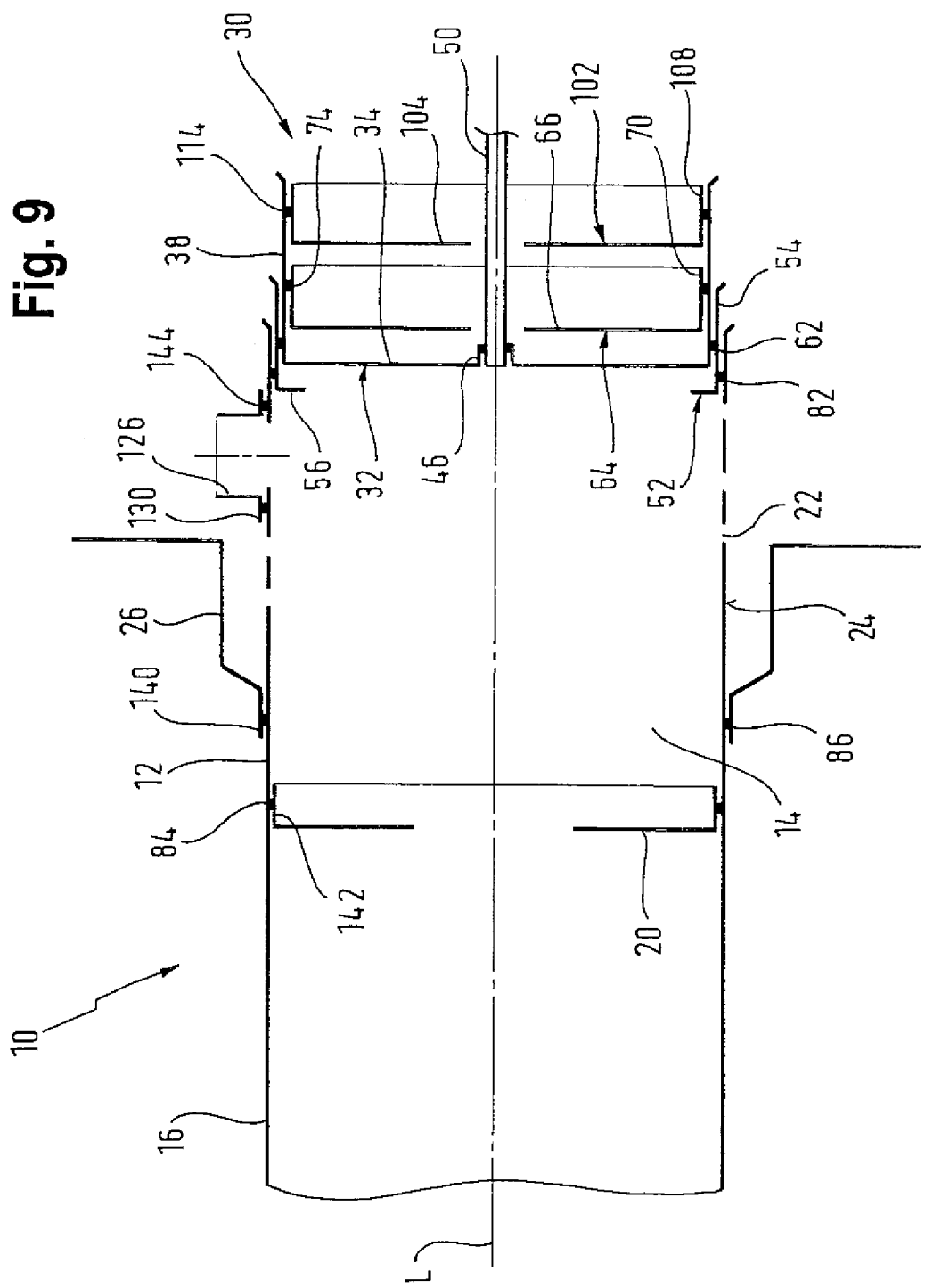
FIG. 9 is a schematic longitudinal view of the combustion chamber elements of a combustion chamber assembly unit, which are to be connected to one another by laser welding.

FIG. 9 shows in a schematic view the components or assembly units that form combustion chamber elements, which are to be connected with one another in wall areas located in a radially staggered pattern in relation to one another by laser welding. All these combustion chamber elements form a skeleton of the combustion chamber assembly unit 10, into which components or assembly units, which were also explained above, are to be integrated. It can be clearly recognized that especially in the area of the bottom assembly unit 30 and also of the connection of the bottom assembly unit 30 with the combustion chamber circumferential wall 12, a plurality of circumferential walls 12, 38, 70, 108, which are located in a radially staggered pattern in relation to one another and also extend axially one over the other, are provided. All these circumferential walls may be connected with one another, for example, by a laser weld seam extending in the circumferential direction about the longitudinal axis L of the combustion chamber, so that a connection is formed that is not only stable but is also liquid-tight or gas-tight. Since all these welded connection areas, i.e., especially the weld seams 82, 62, 74 and 114, are positioned in axial areas positioned axially offset in relation to one another, a mutual interference is avoided, especially even when combustion chamber elements are assembled. The circumferential walls or the combustion chamber elements to be connected with one another are advantageously always connected with one another by welding in pairs. If sufficiently thin materials are used, connection of more than two wall areas located in a radially staggered pattern could possibly also be performed with the use of a laser welding operation.

The mounting flange 26 forming a combustion chamber element with a circumferential wall 140 thereof is likewise arranged such that it surrounds the combustion chamber circumferential wall 12 on its outer side 24 and is connected with this by laser welding, especially the laser weld seam 86. The flame diaphragm 20 may also have a circumferential wall 142, which extends essentially in the direction of the longitudinal axis L of the combustion chamber and which is in contact with the inner side of the combustion chamber circumferential wall 12 and is connected with the combustion chamber circumferential wall 12 by the laser weld seam 84.

The ignition element holder 128 may also be connected to the combustion chamber circumferential wall 12 by using its edge area 130 forming a wall area by forming a laser weld seam 144 extending along this edge area 130.

In the welded connection of walls located in a radially staggered pattern, the present invention utilizes the aspect that especially when designing the different combustion chamber elements as deep-drawn sheet metal parts, it is possible to work with comparatively high accuracy, so that these are also in direct contact with one another essentially over the entire circumference and in the entire contact area intended, so that a laser welding device brought to them can generate a weld seam with high quality in a reliable manner. In areas in which combustion chamber elements are also held on each other by press fit, the laser welding operation can be carried out in an especially simple manner without the need to fix these components additionally at each other. Since, furthermore, essentially all weld seams are to be provided in different axial areas, it is possible to connect a plurality of combustion chamber elements with one another simultaneously in one operation by means of laser welding devices positioned offset in the direction of the longitudinal axis L of the combustion chamber. For example, the mounting flange 26 and the flame diaphragm 20 can be welded simultaneously to the combustion chamber circumferential wall 12. For example, the second holding part 64 and the third holding part 102 can also be welded simultaneously to the bottom part 32.

Figure 10:
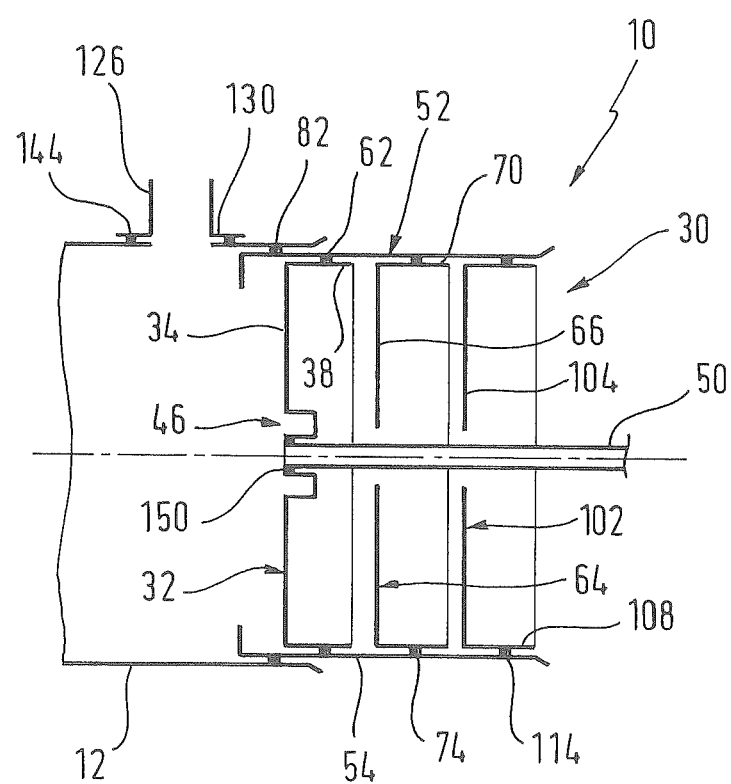
FIG. 10 is a view corresponding to FIG. 9 of a modified embodiment.

FIG. 10 shows an alternative embodiment, which differs from the above-described embodiments especially in the connection of the bottom part 32, of the second holding part 64 and of the third holding part 102 to the first holding part 52. The second holding part 64 and also the third holding part 102 are not inserted into the bottom part 32, but are arranged such that they follow this axially, so that the second circumferential wall 54 of the first holding 52 extends axially over both the first circumferential wall 38 of the bottom part 32 and the third circumferential wall 70 of the second holding part 64 and the fourth circumferential wall 108 of the third holding part 102 and are thus connected, for example, simultaneously when a laser welding operation is carried out while generating the laser weld seams 62, 74 and 114. Essentially identical sheet metal blanks may be used in this embodiment for the bottom part 32, the second holding part 64 and the third holding part 102, and the bend 46 for connecting the fuel feed line 50 is to be provided only in the area of the first bottom wall 34, while an opening each is to be provided in the bottom walls 66 and 104 for the passage of the fuel feed line 50.

In FIG. 10, the bottom part 32 is designed with a double bend 46 in its central area for connecting the fuel feed line 50, so that the bottom part 32 is bent at first in the direction away from the combustion chamber and, radially farther inside, further towards the combustion chamber. The fuel feed line 50 and the bottom part 34 may then be connected in their edge areas overlapping each other by axial or front-side welding by means of a weld seam 150. As an alternative, provisions could, of course, be made in this embodiment as well for the fuel feed line 50 to be connected to the bottom part 32 in the manner described, for example, with reference to FIG. 9.

While specific embodiments of the invention have been shown and described in detail to illustrate the application of the principles of the invention, it will be understood that the invention may be embodied otherwise without departing from such principles.

What is claimed is:

1. A vaporizing burner combustion chamber assembly unit for a vehicle heater, the combustion chamber assembly unit comprising:

at least two combustion chamber elements with wall areas, which are arranged radially staggered in relation to one another in reference to a longitudinal axis of the combustion chamber and are fixed to one another by laser welding;

a porous evaporator medium, wherein:

one of the at least two combustion chamber elements comprises a circumferential wall, which surrounds the longitudinal axis of the combustion chamber without interruptions and extends essentially in a direction of the longitudinal axis of the combustion chamber;
another of the at least two combustion chamber elements comprises a circumferential wall, which surrounds the longitudinal axis of the combustion chamber without interruptions and extends essentially in the direction of the longitudinal axis of the combustion chamber; and
the circumferential wall of the one combustion chamber element extends axially at least partially over the circumferential wall of the other combustion chamber element, on an outer side and is fixed to same by laser welding,
wherein the at least two combustion chamber elements with wall areas comprise a bottom assembly unit comprising:
the one of the at least two combustion chamber elements comprising a bottom element forming a combustion chamber element with a first bottom wall and with a first circumferential wall, which extends from an outer edge area of the first bottom wall essentially in the direction of the longitudinal axis of the combustion chamber, in a direction away from the combustion chamber; and
the other of the at least two combustion chamber elements comprising a ring-shaped first holding part forming a combustion chamber element with a second circumferential wall and with a contact area touching the porous evaporator medium provided at the first bottom wall, wherein the second circumferential wall extends axially at least partially over the first circumferential wall on an outer side and is fixed to same by laser welding,
wherein the bottom assembly unit further comprises a second holding part forming a combustion chamber element with a second bottom wall and with a third circumferential wall, which extends from a radially outer edge area of the second bottom wall essentially in the direction of the longitudinal axis of the combustion chamber in the direction away from a combustion chamber, wherein at least the first circumferential wall extends axially at least partially over the third circumferential wall on an outer side and is fixed to same by laser welding, and wherein a first mounting space is formed between the first bottom wall and the second bottom wall,
wherein:
the second circumferential wall is fixed at the first circumferential wall in a first axial area by laser welding;
at least the first circumferential wall is fixed at the third circumferential wall in a second axial area by laser welding; and
the first axial area is axially offset in relation to the second axial area.

2. A combustion chamber assembly unit in accordance with claim 1, wherein the circumferential wall of the one combustion chamber element and the circumferential wall of the other combustion chamber element are at least one of in contact with one another and fitted one into the other by a press fit.

3. A combustion chamber assembly unit in accordance with claim 1, wherein the circumferential wall of the one combustion chamber element and the circumferential wall of the other combustion chamber element are fixed to one another by a laser weld seam extending about the longitudinal axis of the combustion chamber.

4. A combustion chamber assembly unit in accordance with claim 1, wherein:

the bottom assembly unit further comprises a third holding part forming a combustion chamber element with a third bottom wall and with a fourth circumferential wall, which extends from a radially outer edge area of the third bottom wall essentially in the direction of the longitudinal axis of the combustion chamber, in the direction away from a combustion chamber;
at least one of the first circumferential wall and the second circumferential wall and the third circumferential wall extends axially at least partially over the fourth circumferential wall, on an outer side and is fixed to same by laser welding; and
a second mounting space is formed between the second bottom wall and the third bottom wall.

5. A combustion chamber assembly unit in accordance with claim 4, wherein:
the second circumferential wall is fixed at the first circumferential wall in a first axial area by laser welding;
at least one of the first circumferential wall and the second circumferential wall is fixed at the third circumferential wall in a second axial area by laser welding;
the first axial area is axially offset in relation to the second axial area;
at least one of the first circumferential wall and the second circumferential wall and the third circumferential wall is fixed at the fourth circumferential wall in a third axial area by laser welding; and
the third axial area is axially offset in relation to at least one of the first axial area and the second axial area.

6. A combustion chamber assembly unit in accordance with claim 1, wherein
a bend which extends axially over a fuel feed line on an outer side thereof, is provided at the first bottom wall;
the fuel feed line forms a combustion chamber element and is fixed at the bend of the first bottom wall by laser welding.

7. A combustion chamber assembly unit in accordance with claim 1, wherein the one of the at least two combustion chamber elements comprises a combustion chamber circumferential wall forming a combustion chamber element, wherein the combustion chamber circumferential wall extends axially at least partially over a circumferential wall of a bottom assembly unit forming a combustion chamber element on an outer side thereof and is fixed to same by laser welding.

8. A combustion chamber assembly unit in accordance with claim 7, further comprising a porous evaporator medium, wherein the at least two combustion chamber elements with wall areas comprise a bottom assembly unit comprising:
the one of the at least two combustion chamber elements comprising a bottom element forming a combustion chamber element with a first bottom wall and with a first circumferential wall, which extends from an outer edge area of the first bottom wall essentially in the direction of the longitudinal axis of the combustion chamber, in a direction away from the combustion chamber;
the other of the at least two combustion chamber elements comprising a ring-shaped first holding part forming a combustion chamber element with a second circumferential wall and with a contact area touching the porous evaporator medium provided at the first bottom wall, wherein the second circumferential wall extends axially at least partially over the first circumferential wall on an outer side and is fixed to same by laser welding; and the combustion chamber circumferential wall extends axially at least partially over the second circumferential wall of the first holding part radially on the outside and is fixed to same by laser welding.

9. A combustion chamber assembly unit in accordance with claim 1, wherein the combustion chamber circumferential wall forms a combustion chamber element, wherein at least one of the following elements are fixed at the combustion chamber circumferential wall by laser welding:

an ignition element holder forming a combustion chamber element, wherein the ignition element holder is in contact by a contact edge area forming a wall area with an outer side of the combustion chamber circumferential wall and is fixed to same by laser welding;

a combustion chamber fastening element forming a combustion chamber element, wherein the combustion chamber fastening element extends with a circumferential wall axially over the combustion chamber circumferential wall on an outer side thereof and is fixed to same by laser welding; and a combustion chamber element forming a flame diaphragm, wherein the flame diaphragm comprises a circumferential wall, over which extends axially the combustion chamber circumferential wall on an outer side thereof and to which the flame diaphragm is fixed by laser welding.

10. A combustion chamber assembly unit in accordance with claim 1, wherein the at least two combustion chamber elements that are fixed to one another by laser welding are designed as deep-drawn sheet metal parts from steel plate.

11. A combustion chamber assembly unit in accordance with claim 3, wherein the laser weld seam extends about the longitudinal axis of the combustion chamber without interruptions.

12. A burner comprising:

a bottom element with a first bottom wall having an outer edge, said bottom element including a first circumferential wall extending from said outer edge in a first axial direction of said first circumferential wall;

a porous evaporator medium mounted on a side of said first bottom wall facing in a second axial direction of said first circumferential wall, said second axial direction being opposite to said first axial direction;

a first holding part with a second circumferential wall and with a contact area extending radially inward from said second circumferential wall, said second circumferential wall extending axially at least partially over, and fixed to, said first circumferential wall on a radial outer side of said first circumferential wall, said first holding part being arranged on said bottom element to place said contact area in contact with a side of said porous evaporator medium facing in said second axial direction;

a second holding part with a second bottom wall having an outer edge, said second holding part including a third circumferential wall extending from said outer edge of said second bottom wall in said first axial direction, said first circumferential wall extending axially at least partially over, and fixed to, said third circumferential wall on a radial outer side of said third circumferential wall, said second holding part being arranged in said bottom element to position said second bottom wall axially spaced from said first bottom wall in said first axial direction, said first and second axial walls and their axial spacing define a mounting space.

13. A burner in accordance with claim 12, wherein:

said first holding part is fixed to said bottom element by a first weld connection between said first circumferential wall and said second circumferential wall;

said bottom element is fixed to said second holding part by a second weld connection between said first circumferential wall and said third circumferential wall, said first weld connection being axially spaced from said second weld connection.

* * * * *